US007728562B2

(12) United States Patent
Kajouke et al.

(10) Patent No.: US 7,728,562 B2
(45) Date of Patent: Jun. 1, 2010

(54) VOLTAGE LINK CONTROL OF A DC-AC BOOST CONVERTER SYSTEM

(75) Inventors: Lateef A. Kajouke, San Pedro, CA (US); Brian A Welchko, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 300 days.

(21) Appl. No.: 11/829,285

(22) Filed: Jul. 27, 2007

(65) Prior Publication Data

US 2009/0027933 A1   Jan. 29, 2009

(51) Int. Cl.
*G05F 1/10* (2006.01)
*H02M 7/537* (2006.01)
(52) U.S. Cl. ...................... 323/222; 323/131
(58) Field of Classification Search .............. 363/34, 363/35, 37, 84, 89, 125, 127, 131, 132; 323/222, 323/223, 225; 318/800–803, 812
See application file for complete search history.

(56) References Cited

U.S. PATENT DOCUMENTS

| 5,710,699 | A  | * | 1/1998 | King et al. ................. 363/132 |
| 6,750,633 | B2 | * | 6/2004 | Schreiber .................... 322/12 |
| 7,579,792 | B2 | * | 8/2009 | Nagashima et al. ......... 318/105 |

FOREIGN PATENT DOCUMENTS

CN    1465492 A    1/2004

OTHER PUBLICATIONS

Office Action issued on Mar. 31, 2010, for Chinese Patent Application No. 200810214764.

* cited by examiner

*Primary Examiner*—Matthew V Nguyen
(74) *Attorney, Agent, or Firm*—Ingrassia Fisher & Lorenz, P.C.

(57) ABSTRACT

Systems and methods are disclosed for a DC boost converter. The systems and methods combine operation of an inductor with the input capacitor of a DC/AC inverter via a switch configuration to power the DC/AC inverter. The switch configuration is controlled by a plurality of control signals generated by a controller based on a variety of control modes, and feedback signals.

8 Claims, 2 Drawing Sheets

VOLTAGE LINK CONTROL OF A DC-AC BOOST CONVERTER SYSTEM

TECHNICAL FIELD

Embodiments of the present invention relate generally to electric power converters, and more particularly relate to DC-AC inverters.

BACKGROUND

An inverter is an electronic circuit for converting direct current (DC) to alternating current (AC). Inverters are used in a wide range of applications, from small uninterruptible power supplies for a computer to large electric power transport utility applications, and variable speed industrial drives. Inverters are also used to provide a source of AC power from fuel cell or photovoltaic solar cell power supplies. A common application is to power an AC electric motor.

Three-phase is a common type of AC that can be produced by an inverter and used for electric power applications. An important type of three-phase load is an AC electric motor. A three-phase AC electric motor has a simple design, high torque at low RPM, and high efficiency. Three-phase motors are used for pumps, fans, blowers, compressors, electric and diesel-electric locomotives and many other kinds of motor-driven equipment. Three-phase motors are more compact, less expensive, vibrate less, last longer than a single-phase motor of the same power rating, and are subsequently preferred over single-phase for motors above 10 HP (7.5 kW). Hybrid, fuel cell, and electric vehicles often use three-phase motors because their high starting torque can be used to accelerate a vehicle to a useful speed. A three-phase motor can also be used as a generator for regenerative braking.

Hybrid, fuel cell, and electric vehicles generally have a source of DC power. For example, these vehicles may use electric batteries, ultra-capacitors, fuel cells, and fuel powered generators, all producing DC power. Moreover, the different sources will often have different voltages requiring voltage conversion to effectively use their electrical voltages with an inverter. One approach is to use a voltage converter to obtain the various operating voltages.

Voltage converters usually include a capacitor to condition the DC power input to an inverter. This capacitor can be large and expensive. Accordingly, it is desirable to have a system that reduces the size of the input capacitor. Furthermore, other desirable features and characteristics will become apparent from the subsequent detailed description and the appended claims, taken in conjunction with the accompanying drawings and the foregoing technical field and background.

BRIEF SUMMARY

Systems and methods are disclosed for a DC-AC boost converter system. The systems and methods combine operation of an inductor with the input capacitor of a DC/AC inverter via a switch configuration to power the DC/AC inverter. The switch configuration is controlled by a plurality of control signals generated by a controller, based on a variety of control modes and feedback signals.

The system has an inverter with a first DC input, a second DC input, control inputs, AC outputs configured to be coupled to a load, and a voltage source with a first output coupled to a first node, and a second output coupled to the second DC input. The system also has a boost converter connected to the first node, the first DC input, and the second DC input. A multi-phase load may be coupled to the inverter AC outputs.

A controller may also be coupled to the control inputs, where the controller is configured to receive feedback signals from the boost converter and the inverter, and to control current flow through the boost converter and the inverter.

A DC boosting method as described herein begins by determining a control mode for a controller that processes a plurality of control signals and feedback signals. The method then operates a boost converter. The boost converter controls flow of an electrical current, via switches, from an electrical voltage source to an inverter based on a control signal and a feedback signal. The method then operates the inverter. The inverter produces AC outputs for powering a load based on the plurality of control signals and feedback signals. The method then delivers power to the load via the inverter.

BRIEF DESCRIPTION OF THE DRAWINGS

Embodiments of a DC-AC boost converter system will hereinafter be described in conjunction with the following drawing figures, wherein like numerals denote like elements.

DETAILED DESCRIPTION

Figure 1:
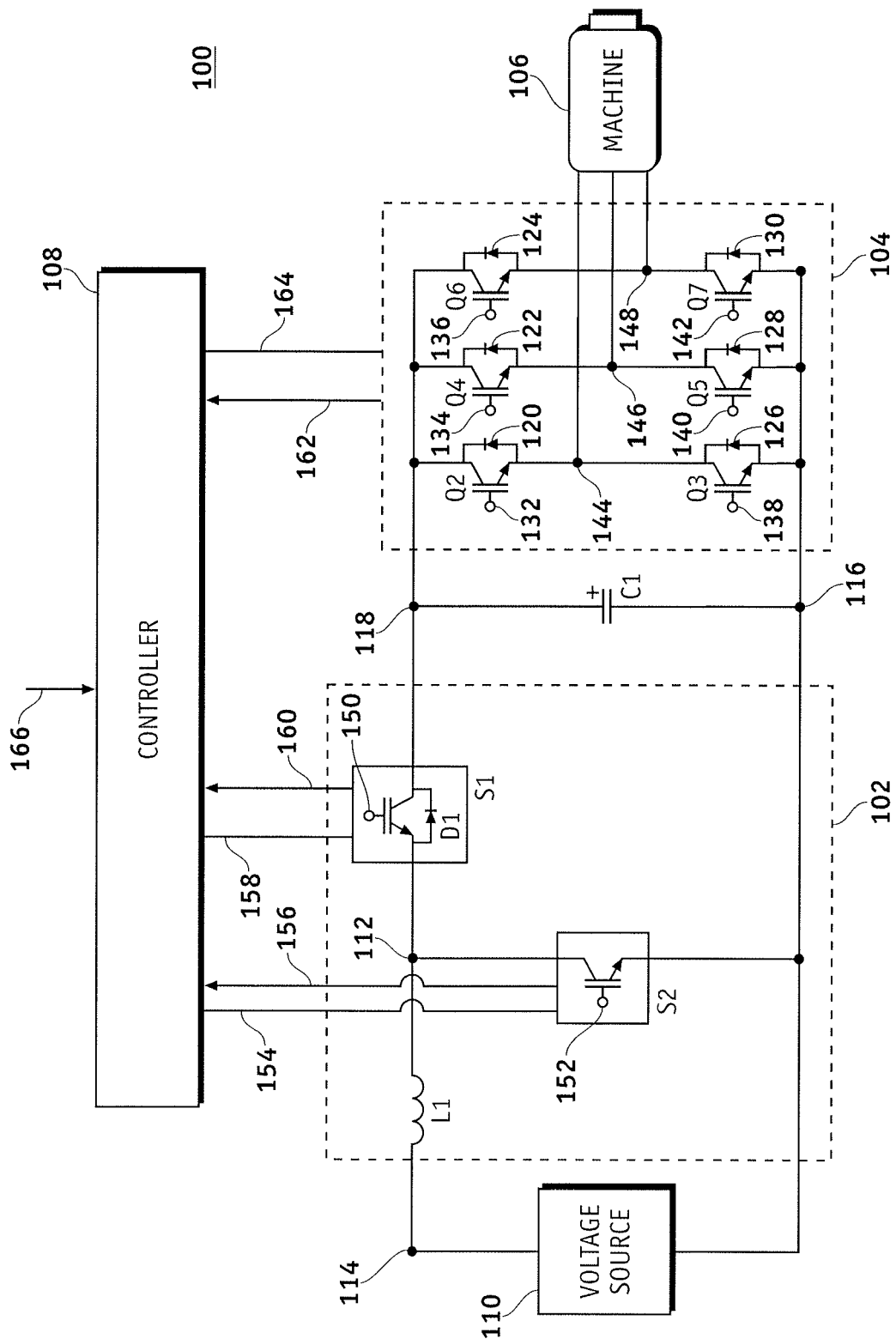
FIG. 1 is a schematic representation of an embodiment of a DC-AC boost converter system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention.

For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts an example arrangement of elements, additional intervening elements, devices, features, or components may be present in an embodiment of the invention (assuming that the functionality of the system is not adversely affected).

Embodiments of the invention are described herein in the context of one practical non-limiting application, namely, a DC-AC boost converter system for a vehicle with a three-phase electric motor. Three-phase inverters are used for variable-frequency drive applications. There are many different power circuit topologies and control strategies used in inverter designs. Different design approaches are used to address various issues that may be more or less important depending on the way that the inverter is intended to be used. Although the technique described here is applicable to operation of an electrical system of a vehicle, embodiments of the invention are not limited to such vehicle applications, and the techniques described herein may also be utilized in other power conversion systems.

A boost converter (step-up converter) is a power converter with an output DC voltage that is greater than its input DC voltage. A boost converter may be considered to be in a class of switching-mode power supplies (SMPS) containing at least two semiconductor switches (e.g., a diode-based switch and a transistor-based switch) and at least one energy storage element. Filters made of inductor and capacitor combinations are often added to a boost converter to improve its output performance.

FIG. 1 is a schematic representation of a DC boost converter system 100 for a vehicle that is suitably configured to perform the operations described in detail herein. System 100 is suitable for use with a vehicle having an electric traction motor (e.g., a fully electric vehicle or a hybrid vehicle). A practical DC boost converter system 100 may include a number of electrical components, circuits and controller units other than those shown in FIG. 1. Conventional subsystems, features, and aspects of the DC boost converter system 100 will not be described in detail herein. For this embodiment, as shown in FIG. 1, the system 100 may include, without limitation: a boost converter 102, an inverter 104, a capacitor C1, which is common to both the boost converter 102 and the inverter 104, and a controller 108. As shown in FIG. 1, boost converter 102 is coupled to a voltage source 110, and inverter 104 is coupled to a machine 106 or other load.

The machine 106 is coupled to the AC output nodes 144/146/148 of controlled switches Q2-Q7. The machine 106 for this example includes an AC electric machine that provides power or additional power to a powertrain, and regenerative braking. AC electric machines are often used for this application because they provide high torque under load, and high power. In practice, machine 106 may be, without limitation, an induction or synchronous three-phase or multi-phase AC electric machine.

The voltage source 110 is configured to support the operation of a hybrid vehicle or an electric vehicle. The voltage source 110 has a first pole or terminal coupled to a node 114 and a second pole or terminal coupled to a node 116. For this embodiment, the nodes 114 and 116 correspond to a positive reference potential and a negative (ground) reference potential, respectively. The voltage source 110 may be coupled in this manner to the boost converter 102, which in turn provides power to the inverter 104. The voltage source 110 is configured to provide an electrical voltage and current to the boost converter 102 via node 114 and node 116. For this embodiment, the electrical voltage provided by the voltage source 110 is a relatively high DC voltage, which may be about 200 volts for this application. The voltage source 110 may be, for example, a generator, a fuel cell, batteries (such as lead acid, nickel metal hydride, or lithium ion batteries), or a number of ultra-capacitors.

The boost converter 102 controls the flow of electrical current from voltage source 110 to inverter 104, based on a plurality of control signals and feedback signals present in system 100. This embodiment of boost converter 102 includes, without limitation: an inductor L1, controlled switches S1 and S2, a gate contact 150, a gate contact 152, and a diode D1. The boost converter 102 has a first input at node 114, coupled to the first pole of voltage source 110, and a second input at node 116, coupled to the second pole of voltage source 110. This description refers to these nodes as "inputs" of boost converter 102 because in most operating conditions current will flow into these inputs, however under some operating conditions, such as regenerative braking, current may flow in a negative direction (recharge current). The boost converter 102 also has a DC output in system 100 referenced between a first output pole at node 118 and a second output pole at node 116.

Inductor L1 is coupled between node 114 and node 112, and is used to resist fluctuation in the DC voltage, and to store energy. An appropriate size of inductor L1 for this embodiment would be about 50 micro-Henrys. Inductor L1 may be used in conjunction with switches S1 and S2 to increase (hence "boost") the voltage of the voltage source 110 by alternately storing and releasing charge from inductor L1.

Regarding switches S1 and S2, the illustrated embodiment employs IGBT controlled switches. In practice, however, other controlled switch types may be utilized. The controlled switch S1 is coupled between node 112 and node 118. In this embodiment the collector of controlled switch S1 corresponds to node 118, and the emitter of controlled switch S1 corresponds to node 112. The controlled switch S2 is coupled between node 112 and node 116. In this embodiment the collector of controlled switch S2 corresponds to node 112, and the emitter of controlled switch S2 corresponds to node 116. The current capacity of the controlled switches is selected according to the power rating of the machine 106, voltage rating of the source 110, and the desired boosted voltage at node 118. In this embodiment, the current capacity is the same for all controlled switches. Gate contacts 150 and 152 are each coupled to the controller 108 for purposes of controlling the operation of switches S1 and S2. The gate contacts 150 and 152 are separately configured to allow current flow or to block current flow in response to control signals provided by the controller 108.

In this application, the controlled switches S1 and S2 control the current flow from the voltage source 110 to inverter 104. Thus, the controlled switches S1 and S2 are switched on and off by control signals from the controller 108 in order to control current flow from the voltage source 110 to inverter 104, which in turn converts the DC into AC that is suitable for use by the machine 106. The controlled switch S1, in conjunction with inverter 104, controls and provides power to the machine 106. The controlled switches S1 and S2 in combination influence whether power/current flows from voltage source 110.

By varying the timing of the opening and closing of the switches S1 and S2 individually or in combination, the boost converter 102 controls the amplitude of the DC voltage into the inverter 104. In practice, the DC voltage is varied to maintain a fixed modulation index ($M_i$) by inverter 104. The modulation index is the ratio of inverter 104 output voltage to the maximum possible output voltage of inverter 104 if it were operated in six-step mode. An $M_i$ equal to one means that inverter 104 is operating in six-step mode, and an $M_i$ equal to zero means that inverter 104 is producing an AC output voltage of zero volts. The RMS capacitor current stress is minimum at a high modulation index. Boost converter 102 can be used to maintain an $M_i$ of, for example, about 0.9. The high voltage DC capacitors used with inverters are generally costly, bulky and may need periodic maintenance due to the high ripple current from the inverter. Operating the inverter at high $M_i$ reduces the capacitor ripple current, capacitor cost, size, and reduces failure.

Switch S1 can be controlled to allow reverse current flow into boost converter 102. Thus, the voltage source 110 can be recharged through switch S1, which allows flow of a recharging current from the three-phase load 106 to the voltage source 110, wherein a recharging current is a current out of the three-phase load 106 operating in generator mode. Again, switch S1 is coupled between node 112 and node 118. Accordingly, switch S1 is controlled to be continuously on in a regenerative operating condition to facilitate recharging of voltage source 110.

Capacitor C1 is included to provide power conditioning and to smooth voltage surges of the inverter 104. The capacitor C1 has a first pole coupled to node 116 and a second pole coupled to node 118. The capacitor C1 is included to buffer electrical energy between the voltage source 110 and the output node 118. In practice, capacitor C1 may be realized as an ultra-capacitor or as any suitable capacitance element or capacitive arrangement. Capacitor C1 may also represent the capacitance that will naturally exist in other components of the hybrid vehicle, such as an active electrical bus and/or power electronics (such components may contain capacitors, power output stages, etc.). The capacitance of capacitor C1 may vary from one application to another, depending on the power required by the machine 106. In this embodiment, capacitor C1 has a capacitance of about 1000 microfarads.

The inverter 104 is configured to produce AC outputs for a load (e.g., machine 106) in response to a plurality of control signals and feedback signals present in system 100. The inverter 104 by itself is a common architecture for a single voltage source inverter, and may be a three-phase or multi-phase inverter. For this example, the inverter 104 is an inverter circuit that includes: controlled switches Q2-Q7, diodes (reference numbers 120, 122, 124, 126, 128, and 130), and gate contacts (reference numbers 132, 134, 136, 138, 140, and 142). The inverter 104 has a first input coupled to node 118 and a second input coupled to node 116. The inverter 104 also has a set of AC outputs coupled as follows: a first AC output corresponding to a node 144, a second AC output corresponding to a node 146, and a third AC output corresponding to a node 148. The respective collectors and emitters of controlled switches Q2-Q7 are coupled as follows in this embodiment: Q2 is between node 118 and node 144, Q4 is between node 118 and node 146, Q6 is between node 118 and node 148, Q3 is between node 116 and node 144, Q5 is between node 116 and node 146, and Q7 is between node 116 and node 148.

The current capacity of the controlled switches is related to the power rating of the machine 106 and maximum voltage at bus 118. In this example, the current capacity is the same for all controlled switches Q2-Q7. Since most loads contain inductance, diodes (reference numbers 120, 122, 124, 126, 128, and 130) are respectively connected across the controlled switches to provide bidirectional current flow across the controlled switches. In this regard, each of the controlled switches Q2-Q7 contains a respective diode between its emitter and collector to allow a negative current from the load to charge the voltage source 110 during regenerative operation. In practice, machine 106 can recharge the voltage source 110 (assuming voltage source 110 is a rechargeable device) during regenerative braking of a vehicle. During regenerative braking from the machine 106, current flows from the machine into the nodes 144, 146, and 148 (i.e., negative or recharge current flow). This embodiment handles such current flow using the gate contacts 132, 134, 136, 138, 140, and 142. In particular, the gate contacts are coupled to the controller 108 to enable control of the respective switches (for the sake of clarity, the individual control signals from controller 108 to each gate contact are not depicted in FIG. 1). The controlled switches Q2-Q7 are switched to allow current flow or to block current flow in response to the voltage of the control signals from the controller 108. During regeneration, the switches are opened, which allows negative current to flow through the diodes and, ultimately, back to voltage source 110.

The controller 108 may be implemented as part of a vehicle computing module, a centralized vehicle processor, a subsystem computing module devoted to the switch arrangement, or the like. The controller 108 is generally a software-controlled device. Under normal conditions, it operates the controlled switches S1, S2, and Q2-Q7 to produce a three-phase AC current during vehicle operation.

The boost converter 102 and inverter 104 arrangement is actuated by controller 108, which can be coupled to the arrangement 102/104 in a manner that allows routing of control input signals 154/158/164. The control input signals 154/158/164 are preferably generated by the controller 108 in response to a variety of control modes and feedback signals 156/160/162 obtained from boost converter 102 and/or inverter 104. In operation, the controller 108 receives feedback signals 156/160/162, and controls the actuation of the controlled switches in accordance with the current state of the vehicle or required power flow, e.g., whether the regenerative braking mode or the normal operating mode is active. The controlled switches S1, S2, and Q2-Q7 are activated by the controller 108 based on a predetermined switching pattern, and the controller may be configured to adjust the pattern based on the feedback signals 156/160/162. In this regard, a controlling pattern for the control signals is generated by the controller for activating the controlled switches S1, S2, and Q2-Q7. Each switch may be activated via its respective control inputs depending on a predetermined duty cycle as explained below in the context of FIG. 2.

Figure 2:
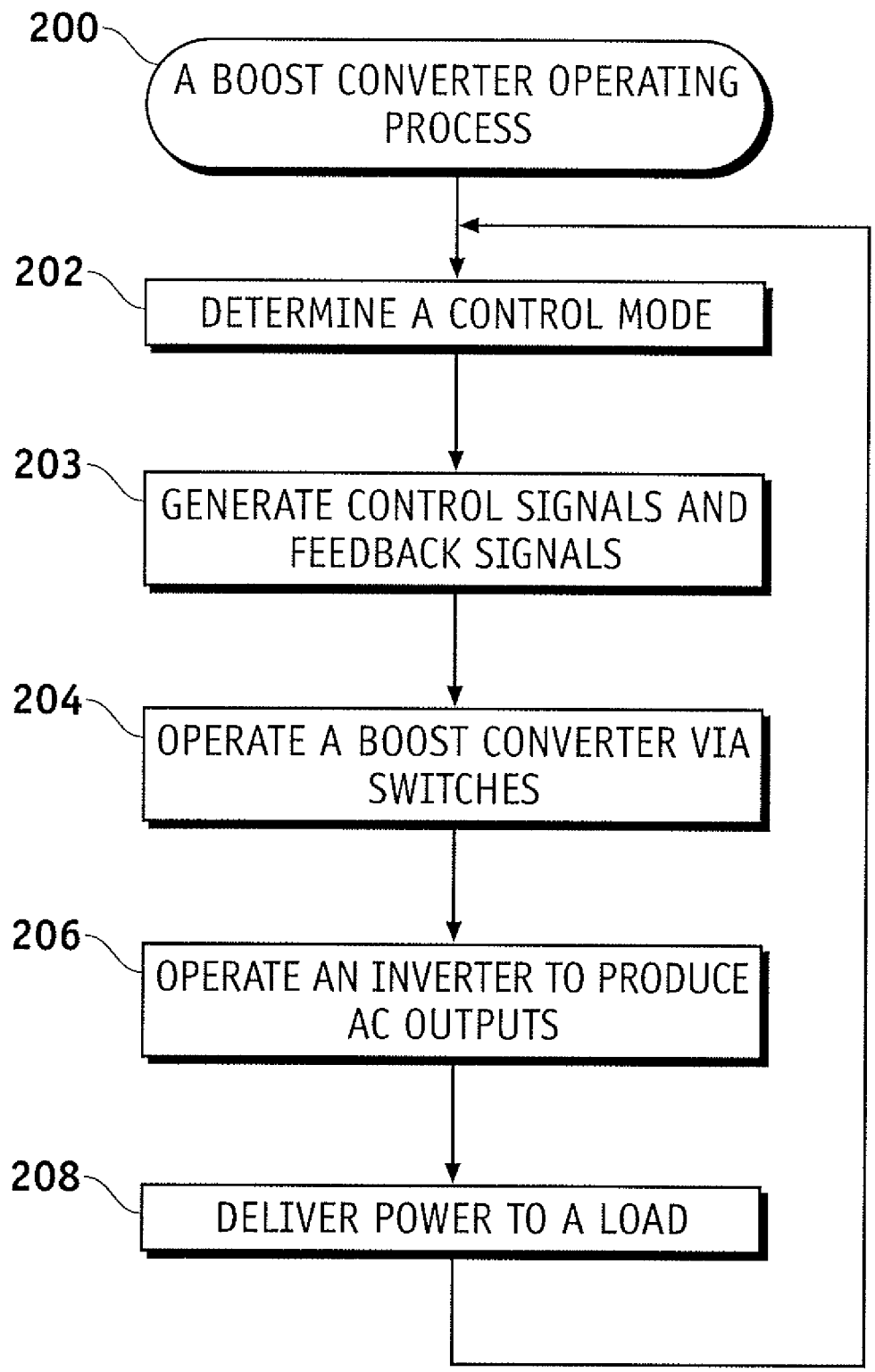
FIG. 2 is a flowchart illustrating an embodiment of a DC-AC boost process.

FIG. 2 is a flowchart illustrating a process 200 for controlling a high voltage DC bus using a boost converter for an electric, hybrid electric, or fuel cell vehicle that may be performed by system 100 as described above. An embodiment of process 200 determines a control mode, generates a plurality of control and feedback signals, operates a boost converter via controlled switches, operates an inverter to produce AC outputs for powering a load, and delivers power to a three-phase load. The various tasks performed in connection with process 200 may be performed by software, hardware, firmware, or any combination thereof. For illustrative purposes, the following description of process 200 may refer to elements mentioned above in connection with FIG. 1. In practical embodiments, portions of process 200 may be performed by different elements of DC boost converter system 100, e.g., the voltage source 110, a boost converter 102, an inverter 104, and a controller 108.

This embodiment of boost converter operating process 200 begins by determining a control mode (task 202). The determination may be made by consideration of various status conditions, for example the RPM of the vehicle wheels, the power output of a gasoline engine, the RPM of the gasoline engine, an amount of charge in voltage source 110, and various relations between these parameters. For example, if a vehicle is braking, then the machine should send power to the voltage sources if they are rechargeable, and determine a regeneration mode. In this regard, the control mode may allow positive current only from voltage source 110, or negative current flow recharging voltage source 110 and C1.

Next, process 200 generates control signals and feedback signals (task 203) as explained in the context of FIG. 1 above. Process 200 then operates a boost converter via controlled switches S1 and S2 in order to control flow of an electrical current from the electrical voltage source through the inductor, and into the inverter based on the control signals and the feedback signals (task 204). Using the controlled switches S1 and S2 in conjunction with the controlled switches Q2-Q7 and proper control, the current flow to the machine can be more precisely controlled. Switching S1 and S2 with a predetermined duty cycle controls power flow from voltage source 110. The controlled switches S1 and S2 and the controlled switches Q2-Q7 may be operated together or independently using Pulse Width Modulation (PWM) to provide power individually or in combination to the machine. The frequency represented by the number of narrow pulses per second is called the switching frequency or carrier frequency. Combining the current from the controlled switches S1 and S2 and the controlled switches Q2-Q7 allows for an even larger number of options since the inductor L1 can be used to store charge and thus increase voltage over and above that of voltage source 110. The combination of switching patterns using, for example, controlled switches S1 and S2 in conjunction with the controlled switches Q2-Q7 will produce more varied levels of voltage. The process essentially boosts the voltage of source 110 to a voltage at node 118 such that the inverter 104 will be operated at a fixed modulation index, $M_i$, which will minimize the RMS current stress on capacitor C1. For this example, the modulation index is approximately 0.9.

Next, process 200 operates an inverter via the controlled switches Q2-Q7 to produce AC outputs for powering the three-phase load (task 206). For this embodiment, each of the controlled switches Q2-Q7 are turned on and off by a Pulse Width Modulation (PWM) control signal. PWM provides control signals to operate the controlled switches Q2-Q7 to produce a desired AC output voltage of modulation index $M_i$.

Power coming from voltage source 110 is regulated by controlling the duty cycle of control signals sent to switches S1 and S2. The duty cycle is determined based on how much power is required from the voltage source 110. During motoring, when S2 is turned off, voltage source 110 and capacitor C1 are connected in parallel through diode D1 to provide current (power) to the machine 106 via the inverter 104. During generating, the current (power) flows from the machine 106 to voltage source 110 and capacitor C1 via the inverter 104 and switch S1. The duty cycles of the control signals for switches S1 and S2 are controlled by a controller as explained above in the context of FIG. 1. For example, with a duty cycle of 30%, switch S2 is on 30% of the switching period.

Process 200 then delivers power to a load (task 208). For this embodiment, the load is an electric machine. Depending on the vehicle operation mode, the electric machine may be operating as a load receiving power from the voltage source 110 through the inverter, or operating as a generator returning power to the first voltage source 110 through the controlled switches S1 and S2 and the controlled switches Q2-Q7. The performance of the electric machine depends on the level of current flow from the switching of the controlled switches S1 and S2 and the controlled switches Q2-Q7 as described above. Process 200 then leads back to task 202.

With this approach, instead of a costly, bulky high voltage DC bus capacitor, a smaller size capacitor with lower probability of failure and cost can be used to control the high voltage DC bus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A DC boost converter system, the system comprising:
    an inverter comprising a first DC input, a second DC input, a plurality of AC outputs, and a plurality of first control inputs, wherein the plurality of AC outputs are configured to be coupled to a load;
    a boost converter coupled to a first node, the first DC input, and the second DC input, the boost converter comprising a plurality of second control inputs, wherein the boost converter is configured to be coupled to a DC voltage source at the first node and the second DC input;
    a capacitor coupled between the first DC input and the second DC input; and
    a controller coupled to the plurality of first control inputs and the plurality of second control inputs, the controller being configured to receive a plurality of first feedback signals from the inverter, and a plurality of second feedback signals from the boost converter, and the controller being configured to control current flow through the boost converter and the inverter.

2. The system according to claim 1, wherein the inverter comprises a single source multi-phase inverter.

3. The system according to claim 1, wherein the boost converter comprises:
    an inductor coupled between the first node and a second node;
    a first switch coupled between the second node and the second DC input, and controlled by one of the plurality of second control inputs; and
    a second switch connected between the second node and the first DC input, and controlled by another one of the plurality of second control inputs.

4. The system according to claim 1, wherein the controller is further configured to control duty cycles of the plurality of first control inputs and the plurality of second control inputs.

5. The system according to claim 1, further comprising a multi-phase load coupled to the plurality of AC outputs.

6. The system according to claim 1, wherein the boost converter is configured to produce a voltage with a high modulation index on the first DC input and the second DC input of the inverter.

7. The system according to claim 6, wherein the high modulation index is greater than 0.9.

8. The system according to claim 1, wherein the boost converter is configured to produce a voltage that is higher than the voltage of the DC voltage source.

* * * * *